H. DENNIS.
CARBURETER.
APPLICATION FILED MAY 8, 1911.
1,003,994.
Patented Sept. 26, 1911.
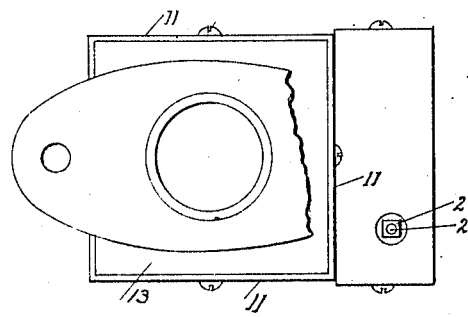
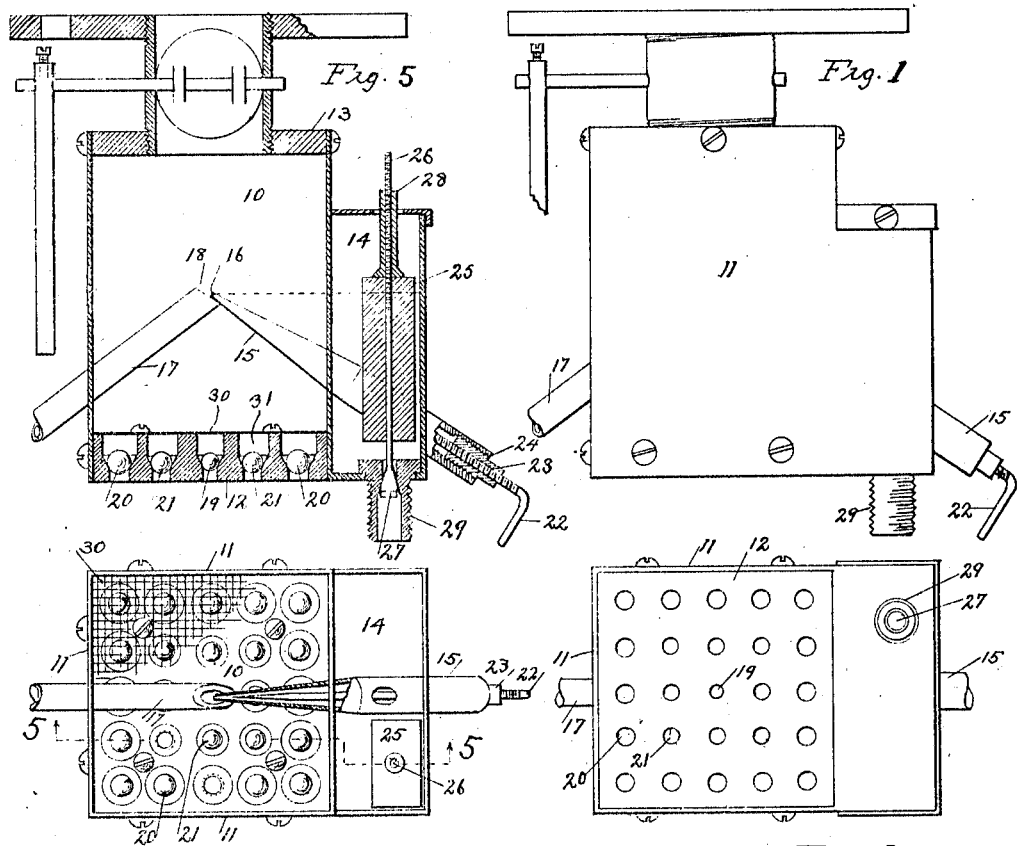
WITNESSES:
INVENTOR
Howard Dennis
BY
L. L. Westfall his ATTORNEY

UNITED STATES PATENT OFFICE.

HOWARD DENNIS, OF SPOKANE, WASHINGTON.

CARBURETER.

1,003,994.  Specification of Letters Patent.  Patented Sept. 26, 1911.

Application filed May 8, 1911. Serial No. 625,789.

*To all whom it may concern:*

Be it known that I, HOWARD DENNIS, a citizen of the United States of America, residing at Spokane, in the county of Spokane and State of Washington, have invented certain new and useful Improvements in Carbureters, of which the following is a specification.

This invention pertains to carbureters and has for its object to provide a mechanism that is economical as to space and yet provide a mixing chamber of sufficient capacity for all practical purposes, and to provide an automatically adjusted supply of gasolene and air to meet the requirements of the change in speeds of an engine from a higher to a lower and a lower to a higher and at the same time provide sufficient capacity in one sized carbureters to serve the purposes for all sizes of engines and any number of cylinders.

I accomplish my purpose by the mechanism shown in the drawings, in which—

Figure 1, is a side elevation of the device, Fig. 2, is a broken away top view of the same, Fig. 3, is a bottom view of the same, Fig. 4, is a top plan view of the same, and Fig. 5, is a vertical section of the same taken on the line 5—5 of Fig. 4.

The mixing chamber 10 has vertical sides 11, a flat bottom 12 and flat top 13, the sides meeting each other at right angles and the bottom and top each connecting with the sides at right angles. This gives a greater space within the chamber 10 for mixing purposes than when the chamber is made round or oval as is the usual custom. This permits of the use of greater economy of space in the mechanical construction surrounding the engine. The float feeding device occupies the chamber 14 adjoining the chamber 10. A needle valve 15 extends diagonally through the chamber 14 and into the chamber 10 with the opening 16 at about the center of the chamber 10.

A primary air supply pipe 17 extends diagonally through the wall 11 of the chamber 10 with its inner end 18 opening at a point directly underneath the opening 16 of the needle valve 15. Auxiliary air is supplied to the chamber 10 through ball valves in the bottom thereof, such valves being of different sizes, the smallest 19 being at the center, the largest 20 at the outer edges thereof, the intermediate sizes 21 intervening. The object of having the smallest at the center, is, that the first valve to open should be as near directly underneath the opening 16 in the needle valve 15 as possible in order that the air coming through the valve will have as near a direct passage through the gasolene supply as possible, it being understood that the specific gravity of the smaller balls is less than that of the larger sizes and that for ordinary use only a portion of the valves would be required, and that when an extraordinary amount of air is required it is likely to be after the engine has become well heated and explosions can be readily effected without the necessity of such particular distinction. The supply of gasolene through the needle valve 15 is regulated by the needle 22 operating through a threaded aperture 23 in the lower end 24 of the valve 15, and the adjustment of the float 25 in the chamber 14 by means of the threaded end 26 of the valve 27 operating through the threaded aperture 28. The gasolene supply pipe is attached to the threaded aperture 29. A screen 30 secured horizontally across the cavities 31 retains the balls 19, 20 and 21 within their operative spheres.

Having thus described my invention, what I claim as new and useful and desire to secure by Letters Patent, is,

1. In a carbureter, a mixing chamber having a flat top and bottom and four vertical sides joining at right angles, an adjustable gasolene feed with a primary air supply conducted to the point of gasolene discharge, ball valves in the bottom of the chamber graduated in size from the center to the outer edges, the smallest being in the center and the largest at the outer edges with intermediate sizes between.

2. In a carbureter, a mixing chamber having a flat top and bottom and four vertical sides joining each other at right angles, provided with a gasolene supply, an unobstructed primary air supply through the side of the chamber and an auxiliary air supply through graduated ball valves in the bottom of the same, the smallest valves being in the center, the largest at the outer edges and intermediate sizes between.

In testimony whereof I affix my signature in presence of two witnesses.

HOWARD DENNIS.

Witnesses:
 GEO. E. CANFIELD,
 WILLIAM H. KAYE.